United States Patent Office 3,123,573
Patented Mar. 3, 1964

3,123,573
ISOMERIZATION CATALYST AND PROCESS
Norman L. Carr, Allison Park, Pa., assignor to The Pure Oil Company, Chicago, Ill., a corporation of Ohio
No Drawing. Filed Dec. 3, 1959, Ser. No. 856,897
7 Claims. (Cl. 252—442)

This invention relates to a new and improved process for the catalytic hydroisomerization of n-pentane and/or n-hexane and is particularly concerned with the preparation and use of a fluorine-containing palladium on silica-alumina catalyst which is resistant to decline in activity resulting from the presence of trace amounts of sulfur compounds in the hydrocarbon feed.

Isomerization has recently come into prominence as a unit process in the petroleum industry for increasing the octane number of low-molecular-weight liquid aliphatic hydrocarbons. In particular, the isomerization of n-pentane and n-hexane has been extensively investigated due to the fact that the isopentanes and isohexanes have substantially higher octane numbers than the corresponding normal paraffins. In the copending patent applications of Hillis O. Folkins et al., Serial No. 765,814, filed October 7, 1958, now abandoned; Serial No. 765,815, filed October 7, 1958, now U.S. Patent 2,943,129; and Serial No. 765,482, filed October 6, 1958, now U.S. Patent 2,943,128, there are described isomerization processes which utilize a solid refractory catalyst consisting of a small amount of palladium supported on an acidic silica-alumina hydrocarbon cracking catalyst containing a small amount of combined fluorine. In the preparation of catalysts in accordance with those copending applications, fluorine is added to the catalyst support as hydrofluoric acid, ammonium fluoride, a fluorinated $C_2$–$C_5$ aliphatic acid, such as trifluoroacetic acid, or precipitated as aluminum fluoride, or zirconium fluoride within the silica-alumina. The processes are described as being applicable to the isomerization of n-$C_4$–$C_7$ hydrocarbons at temperatures below 800° F. and being selective in the conversion of n-pentane and n-hexane to their respective isomers. Folkins et al. describe their isomerization processes in detail and set forth specific ranges and conditions of temperature, pressure, space velocity, and hydrogen/hydrocarbon mol ratio, which are desirable for optimum yields of the $C_4$–$C_7$ isomers and which are necessary to carry out the isomerization process without appreciable amounts of hydrocracking. If the thermodynamic data for the formation of various hydrocarbon isomers are examined, it is seen that the formation of branched-chain $C_4$–$C_7$ alkanes is favored at lower temperatures. Thus, theoretically the maximum yield per pass for formation of branched-chain isomers of the lower alkanes should be obtained at room temperature. It has been found, however, that the conversion of normal paraffins to isoparaffins requires a moderately high temperature and a suitable catalyst if sufficient yields of isoparaffins are to be obtained. The fluorine-containing palladium on silica-alumina catalysts are effective in the isomerization of n-pentane and n-hexane at temperatures of the order of 650°–800° F. These catalysts, however, have a much greater tendency toward hydrocracking and are extremely sensitive to the presence of trace amounts of sulfur in the hydrocarbon feed. The process conditions and method of catalyst preparation must therefore be carefully chosen to obtain a high yield of isoparaffins without an appreciable amount of hydrocracking or catalyst poisoning. It has thus become important to determine isomerization process conditions and catalyst preparation conditions which may be used for a fluorine-containing palladium on silica-alumina catalyst which are conducive to a high rate of isomerization without excessive promotion of undesirable side-reactions, such as hydrocracking and aromatization, and which at the same time result in a substantially zero aging rate for the catalyst resulting from trace amounts of sulfur in the hydrocarbon feed.

It is therefore one object of this invention to provide an improved process for the preparation of a highly active, sulfur-resistant, fluorine-containing isomerization catalyst.

Another object of this invention is to provide a highly active, sulfur-resistant, fluorine-containing isomerization catalyst capable of effecting the isomerization of n-pentane and/or n-hexane to isoparaffins in high yield without substantial decline in catalyst activity on extended use.

Another object of this invention is to provide an improved process for the isomerization of n-pentane and/or n-hexane using an improved catalyst which is resistant to decline of activity on extended use.

A feature of this invention is the provision of a process for the preparation of a highly active, sulfur-resistant, isomerization catalyst in which a silica-alumina support is heated at about 950°–1100° F. for 1 to 20 hours in a stream of an inert gas, followed by treatment of the calcined support with an aqueous solution of a reducible palladium compound and with a fluorine-containing compound reactable with the support, followed by reduction of the impregnated support with hydrogen at elevated temperatures to produce a highly active catalyst.

Another feature of this invention is the provision of an improved isomerization catalyst consisting of about 0.3–0.8% wt. palladium on silica-alumina, containing 70–90% silica, in which the silica-alumina support has been calcined at 950°–1100° F. for about 1 to 20 hours in a stream of inert gas (such as air or nitrogen) and treated with a fluorine-containing compound (such as hydrofluoric acid, ammonium fluoride, fluorinated $C_2$–$C_5$ aliphatic acids, aluminum fluoride, or zirconium fluoride) which is reactable with the support to produce a combined fluorine content of about 1–5% in the catalyst A further feature of this invention is the provision of an improved process for the isomerization of normal pentane and/or normal hexane containing 1–10 p.p.m. sulfur by passing a hydrocarbon feed and hydrogen at isomerization conditions over a catalyst prepared and activated in accordance with this invention.

Other objects and features of this invention will become apparent from time to time throughout the specification and claims as hereinafter related.

According to this invention, it has been found that a superior isomerization catalyst, resistant to sulfur poisoning and/or coke aging, and having a very high activity for isomerization of n-pentane and/or n-hexane may be prepared by calcining a commercial silica-alumina hydrocarbon cracking catalyst (containing 70–90% silica) at a temperature of about 950°–1100° F. for about 1 to 20 hours in a stream of an inert gas, such as nitrogen, air, helium, etc., as a preliminary step in the preparation of the catalyst. The calcined silica-alumina is then impregnated with a fluorine-containing compound reactable with the support, in a form of hydrofluoric acid, ammonium fluoride, fluorinated $C_2$–$C_5$ aliphatic acids, aluminum fluoride, zirconium fluoride, etc., and a solution of a reducible palladium salt, such as the chloride or nitrate, or a solution of a mixed palladium salt, such as ammonium chloropalladite. The impregnation with the fluorine-containing compound may be prior to or concomitantly with the palladium-containing solution. The impregnated catalyst is then reduced at 750°–975° F. in a stream of hydrogen until converted into a highly active form. The resulting catalyst may be formed into pellets or extruded and cut into small catalyst particles.

When hydrogen and n-pentane and/or n-hexane (preferably one of these hydrocarbons alone rather than in mixture) in a hydrogen/hydrocarbon mol ratio of about 0.5–5.0 are passed over a catalyst, prepared and activated as above described, at a temperature of 700°–790° F., a pressure of 100–1000 p.s.i.g., and a liquid volume hourly space velocity of 0.5–25.0, a yield of isoparaffins is obtained which is much higher than is obtained at the same conditions using a catalyst of the same composition which has not been provided with the combined fluorine. Under these isomerization conditions, the hydrocarbon feed may contain 0.10 p.p.m. sulfur without effecting a rapid decline in catalyst activity. In fact, at sulfur concentrations of the order of 3–5 p.p.m., the process may be operated for periods of 100 hours or more without any appreciable decline in catalyst activity. This resistance to sulfur poisoning is characteristic of catalysts which are prepared in accordance with this invention, which catalysts must have received the preliminary calcining treatment as part of the preparation of the catalyst support. When isomerization of n-pentane and/or n-hexane is carried out using a catalyst of the same composition and containing combined fluorine, but which has not received the preliminary calcining treatment, the presence of more than about 1 p.p.m. sulfur in the feed results in a very rapid decline in catalyst activity.

The following non-limiting examples illustrate the preparation and use of catalysts made and used in accordance with this invention and catalysts made according to other procedures which do not offer the advantages of this invention. These examples therefore are not for the purpose of limiting the invention, but rather for the purpose of demonstrating the scope of the invention.

*Example I*

A commercial 75/25 silica-alumina cracking catalyst was dried at 400° F. for a period of 3 hours. A portion of the catalyst support was impregnated with a solution of palladium chloride in aqueous hydrofluoric acid in concentrations sufficient to produce a palladium content of 0.65% wt. and a combined fluorine content of about 2% in the resulting catalyst. The impregnated catalyst thus produced was dried and reduced with hydrogen at a temperature of 750°–975° F. to produce a highly active catalyst of the desired composition. The procedure for preparation of the catalyst is described in considerable detail in the aforementioned copending application of Hillis O. Folkins et al. The catalyst which was thus prepared, consisting of 0.65% palladium on 75/25 silica-alumina, containing 2% combined fluorine, was formed into ⅛" diameter pellets. This catalyst was used in the isomerization of a technical-grade n-pentane (consisting of about 97% n-pentane, 2% cyclopentane, and 1% hexane) having a sulfur content of 3–5 p.p.m. (in the form of dimethyl sulfide) at a temperature of 762° F. and a pressure of 580 p.s.i.g. Hydrogen and the n-pentane feed in a mol ratio of 2.5 were passed over the catalyst at the aforementioned temperature and pressure in an extended isomerization run. This catalyst had an initial reaction rate constant K of 17.5 for the conversion of n-pentane to isopentane. The reaction rate constant K is the first-order rate constant for the isomerization reaction and is expressed in accordance with the equation:

$$K = (LWHSV) \ln \left[ \frac{1}{1 - \frac{x}{62}} \right]$$

where LWHSV is the liquid weight hourly space velocity and $x$ is the percent isopentane yield. The rate constant K provides a basis for comparison of catalyst activity under different conditions of temperature, space velocity, etc. Under these reaction conditions, and using the aforementioned n-pentane feed, the yield of isopentane declined at a rate of 5.8 yield units (percent) per 100 hours. This rate of decline in catalyst activity is so severe as to make the catalyst ineffective for isomerization runs in excess of about 2 weeks. When an isomerization catalyst is prepared in accordance with the aforementioned Folkins et al. processes in which the fluorine is added in the form of ammonium fluoride, fluorinated $C_2$–$C_5$ aliphatic acids, precipitated aluminum fluoride, or zirconium fluoride, the reaction rate constant for conversion of n-pentane to isopentane is substantially the same as in this example. The rate of decline in catalyst activity in the presence of a sulfur-containing feed is similar.

*Example II*

A catalyst consisting of 0.65% wt. palladium on 75/25 silica-alumina, containing 2% combined fluorine, was prepared as in the previous example and used in the isomerization of a feed consisting of 90% n-pentane, 6% cyclopentane, and 4% hexane. The feed was hydrodesulfurized and passed through a guard case to reduce the sulfur content to less than 1 p.p.m. The catalyst had an initial rate of decline in activity of 0.5 unit (percent) per 100 hours under isomerization reaction conditions. After extended use, the catalyst became fouled from coke and was subjected to a regeneration treatment by sequential oxidation and reduction to remove coke from the catalyst and reactivate the catalyst to substantially initial activity. After the catalyst was regenerated in this manner, it was again used in the isomerization of the aforementioned hydrocarbon feed. The isomerization was carried out at a temperature of 745° F., a pressure of 560 p.s.i.g., and hydrogen/hydrocarbon mol ratio of 2.8. Under these reaction conditions, the regenerated fluorine-containing, palladium on silica-alumina catalyst had an aging rate (decline in activity) of 8.3 units (percent) per 100 hours on stream. From this example, it is seen that the fluorine-containing catalyst prepared in this manner has a high initial activity and a low initial aging rate. However, after regeneration, this catalyst had a rapid aging rate.

*Example III*

A commerial 75/25 silica-alumina hydrocarbon cracking catalyst was heated to a temperature of 975° F. in a stream of nitrogen at atmospheric pressure for a period of about 4 hours. After calcining, the silica-alumina was impregnated with a solution of palladium chloride in aqueous hydrofluoric acid of a concentration such that the resulting catalyst contained 0.65% wt. palladium and 2% combined fluorine. The catalyst was dried and reduced with hydrogen at a temperature of 750°–975° F. to produce a highly active catalyst of the same composition. This catalyst was used in the isomerization of technical-grade n-pentane under the same conditions as the catalyst of Example I. A mixture of hydrogen and n-pentane in a mol ratio of 2.5, at a pressure of 580 p.s.i.g., and reaction temperature of 762° F. were passed over the catalyst. As in Example I, the hydrocarbon feed contained 3–5 p.p.m. of sulfur (in the form of dimethyl sulfide). This catalyst had an initial isomerization reaction constant K of 19. In an extended isomerization run, the catalyst exhibited no measurable decline in activity and the rate of decline in yield of isopentane was substantially zero.

When this catalyst is regenerated after extended use, it attains substantially its initial activity. When this catalyst is used in a sulfur-free feed, as in Example II, after regeneration, there is no measurable decline in activity as occurred in Example II.

When a silica-alumina catalyst support is calcined in the manner of this example and subsequently impregnated with a fluorine-containing compound which is reactable with the support, such as ammonium fluoride, fluorinated $C_1$–$C_5$ aliphatic acids (such as trifluoroacetic acid), or precipitated fluorine-containing compounds, such as aluminum fluoride, or zirconium fluoride, and impregnated with a palladium compound and reduced with hydrogen, the catalyst which is produced has a very high activity for isomerization of n-pentane and/or n-hexane. The resulting catalysts are not only of very high initial activity, but also are highly resistant to decline in activity resulting from small amounts of sulfur in the hydrocarbon feed. Catalysts of this type are highly resistant to sulfur contents as high as 10 p.p.m. and are quite stable in the presence of feeds containing 3–5 p.p.m. of sulfur, which would rapidly deactivate catalysts prepared in a conventional manner.

While this invention has been described with special emphasis upon certain preferred embodiments, it should be understood that considerable variation may be allowed in certain of the process conditions in preparation of the catalyst and the isomerization reaction conditions without departing from the scope and the intent of this invention. The invention is applicable to the preparation of isomerization catalysts using acidic silica-alumina hydrocarbon cracking catalysts as supports and is particularly useful in connection with silica-alumina containing 70–90% silica. The silica-alumina support is preferably treated at 975° F. in a flowing stream of an inert gas, such as air, nitrogen, helium, etc., for a period of about 4 hours. However, the calcining time may vary from about 1 to 20 hours. In the preparation of the catalyst, the solution of palladium compound is of a concentration to produce a content of 0.3–0.8% wt. in the finished catalyst. Lesser amounts of palladium may be used, but produce catalysts of substantially lesser activity, while the use of higher concentrations of palladium are wasteful in that no appreciable increase in activity is obtained. In providing combined fluorine in the resulting catalyst, the catalyst support may be treated with any fluorine-containing compound which is reactable with the support to provide a fluorine content of 1–5% in the support. The fluorine compounds may be added in the form of hydrofluoric acid, ammonium fluoride, fluorinated $C_2$–$C_5$ aliphatic acids, or may be precipitated within the support in the form of aluminum fluoride, or zirconium fluoride. The fluorine compounds may be added either prior to or concomitantly with the solution of the palladium compound. The catalyst which is produced is activated by reduction with hydrogen at temperatures in the range of 750°–975° F., although lower temperatures (e.g., 750°–800° F.) appear to result in more active catalysts. When the catalysts are used in the isomerization of n-pentane or n-hexane, it is preferred that a relatively pure hydrocarbon be used as feed. Thus, it is preferred that the n-pentane or n-hexane used be the predominant hydrocarbon in the feed and preferably be present in the amount of about 90% or more of the feed. While the flow rate of reactants (LWHSV) is not a critical factor in the reaction, it does influence the yield and at lower space velocities, higher yields per pass through the reactor are obtained. The isomerization reaction may be carried out at pressures of 100–1000 p.s.i.g., although pressures of the order of 500–650 p.s.i.g., are preferred. Hydrogen/hydrocarbon mol ratios of 0.5–5.0 may be used, but mol ratios of the order of 2.0–3.5 are preferred and give both a higher activity and lower aging rate for the catalyst. The reaction temperature may vary in the range from 700° to 790° F., preferably about 750°–775° F. At the lower end of the temperature range, the rate of conversion of n-pentane or n-hexane to the corresponding isomers is relatively low, while at the upper end of the temperature range, the reaction rate is higher but conditions of temperature and pressure of hydrogen and hydrocarbon feed must be carefully controlled to prevent coke aging of the catalyst. While the catalyst is resistant to sulfur concentrations as high as 10 p.p.m. in the hydrocarbon feed, it is preferred to keep the sulfur content of the feed as low as possible since the catalyst is almost completely resistant to sulfur poisoning at sulfur contents of 3–5 p.p.m. when the catalyst is prepared according to this invention.

The embodiments of the invention in which an exclusive property or privilege is claimed are defined as follows:

1. A method of preparing a sulfur-resistant isomerization catalyst which comprises heating a silica-alumina hydrocarbon cracking catalyst, containing 70–90% silica, at a temperature of about 950°–1100° F. for about 1 to 20 hours in a stream of inert gas, impregnating the catalyst with a solution of a palladium compound in an amount sufficient to produce a palladium concentration of about 0.3–0.8% wt. and with a fluorine-containing compound reactable with the support in an amount sufficient to provide a 1–5% combined fluorine in the catalyst, and reducing the palladium-impregnated catalyst with hydrogen at 750°–975° F.

2. A method in accordance with claim 1 in which the fluorine-containing compound is selected from the group consisting of hydrofluoric acid, fluorinated $C_2$–$C_5$ aliphatic acids, ammonium fluoride, aluminum fluoride, and zirconium fluoride.

3. A method in accordance with claim 2 in which the fluorine compound is added in solution with the palladium compound.

4. A method of preparing a sulfur-resistant isomerization catalyst which comprises heating a silica-alumina hydrocarbon cracking catalyst, containing about 75% silica, at a temperature of about 975° F. for about 4 hours in a stream of inert gas, impregnating the catalyst with a solution of a palladium compound in an amount sufficient to produce a palladium concentration of about 0.65% wt. and hydrofluoric acid in a concentration sufficient to provide 2% combined fluorine in the catalyst, and reducing the palladium-impregnated catalyst with hydrogen at 750–975° F.

5. A sulfur-resistant hydroisomerization catalyst prepared in accordance with claim 1.

6. A sulfur-resistant hydroisomerization catalyst prepared in accordance with claim 2.

7. A sulfur-resistant hydroisomerization catalyst prepared in accordance with claim 4.

References Cited in the file of this patent

UNITED STATES PATENTS

| | | |
|---|---|---|
| 2,550,531 | Ciapetta | Apr. 24, 1951 |
| 2,606,878 | Haensel | Aug. 12, 1952 |
| 2,743,215 | Riblett et al. | Apr. 24, 1956 |
| 2,838,444 | Teter et al. | June 10, 1958 |
| 2,838,445 | Teter et al. | June 10, 1958 |
| 2,878,192 | De Rosset et al. | Mar. 17, 1959 |
| 2,888,501 | Folkins et al. | May 26, 1959 |
| 2,914,464 | Burton et al. | Nov. 24, 1959 |
| 2,943,128 | Folkins et al. | June 28, 1960 |
| 2,943,129 | Miller et al. | June 28, 1960 |
| 2,967,207 | Miller et al. | Jan. 3, 1961 |
| 3,006,841 | Haensel | Oct. 31, 1961 |

FOREIGN PATENTS

| | | |
|---|---|---|
| 487,392 | Canada | Oct. 21, 1952 |